United States Patent [19]

Weon et al.

[11] Patent Number: 5,031,819
[45] Date of Patent: Jul. 16, 1991

[54] AUTOMATIC BRAZE WELDING APPARATUS

[75] Inventors: Kyung S. Weon; Jang J. Moon, both of Suweon, Rep. of Korea

[73] Assignee: Samsung Electronics Co. Ltd., Seoul, Rep. of Korea

[21] Appl. No.: 456,652

[22] Filed: Dec. 29, 1989

[30] Foreign Application Priority Data

Dec. 30, 1988 [KR] Rep. of Korea ............... 17943/88

[51] Int. Cl.⁵ ..................... B23K 1/06; B23K 37/047
[52] U.S. Cl. ................................ 228/49.1; 228/47; 228/183; 228/262
[58] Field of Search ............... 228/8, 9, 47, 183, 262, 228/49.1

[56] References Cited

U.S. PATENT DOCUMENTS

| | | | |
|---|---|---|---|
| 3,386,152 | 6/1968 | Plegat | 228/183 X |
| 3,666,161 | 5/1972 | Keller | 228/12 |
| 3,680,200 | 8/1972 | Terrill et al. | 228/262 X |
| 3,920,176 | 11/1975 | Becker et al. | 228/183 X |
| 4,605,154 | 8/1986 | Rhodes | 228/183 X |

FOREIGN PATENT DOCUMENTS 61-20666 1/1986 Japan .
63-174783 7/1988 Japan .

Primary Examiner—Kenneth J. Ramsey
Attorney, Agent, or Firm—Sterne, Kessler, Goldstein & Fox

[57] ABSTRACT

An automatic braze welding apparatus comprises a divisional rotatable index drive for indexing a rotatable plate in increments of 45°. A plurality of clamping devices are used for safely seating a workpiece radiator at the divisional radial positions of the rotable plate. At least one flux supplying head is mounted on a first position of the divided rotatable plate, and at least one first welding manifold provided with a plurality of torches with at least one position changeable means is mounted on the divisional second and fifth positions, respectively. At least one second welding manifold performs second welding work at the upper surface of the divisional third and sixth positions, and at least one product position correcting device corrects any unbalanced state of the product at the fourth and seventh positions, thereby clamping the radiators by means of the product clamping means and removing it therefrom. The automatic braze welding apparatus according to the present invention preforms flux jetting procedures, first and second welding procedures and correcting procedures in turn.

8 Claims, 13 Drawing Sheets

AUTOMATIC BRAZE WELDING APPARATUS

BACKGROUND OF THE INVENTION

1. Field of the Invention

The invention is related to providing a welding apparatus for sealing predetermined parts by brazing during the manufacture of radiators, and particularly to providing an automatic welding apparatus for sealing by brazing both ends of aluminum radiators, or the like, together through performing an automatic welding procedure.

Generally, most aluminum radiators have been manufactured via manual operation of the braze welding units during sealing procedures. Such welding work requires skillful, highly trained labor. This procedure exposes workers to a gas environment harmful to the human body. Harmful flux gas and liquified natural gas are simultaneously mixed with each other during the welding. This environment inhibits production and adversely affects the quality of the final work product.

2. Related Art

In order to resolve these conventional defects, numerous devices, such as automatic welding apparatus, have been developed for welding together the internal diameter of two bellows members.

One example is described in U.S. Pat. No. 3,666,161, which includes a frame means carrying a rotatable or indexable member having a plurality of fixtures thereon. Each fixture is adapted to receive and hold two bellows members with the internal diameters thereof suitably positioned for welding. When the fixtures are loaded with the bellows members, an operator causes an indexing means to index or rotate the members to cause the loaded fixtures to move from the loading station to an adjacent welding station. When the loaded fixtures reach the welding station, the internal diameters of the bellows members are automatically welded together.

Known apparatus of the type described above are functionally limited. Due to inaccuracies, the automated welding procedure has low marketable product yield.

SUMMARY OF THE INVENTION

Accordingly, the present invention is directed to an a simplified and more economical apparatus for automated welding of both ends of the aluminum radiator in a brazing operation.

The invention also provides an automatic braze welding apparatus provided with a position correcting means for correcting the unbalanced state of the predetermined members to be clamped independent of the dimensions of the articles.

Another aspect of the invention is to provide an automatic braze welding apparatus adapted to welding non-ferrous metals, and particularly to welding aluminum or copper.

The invention comprises an automatic braze welding apparatus which includes: a divisional rotatable indexing means rotated in 45° increments; a plurality of clamping means for safely seating radiator workpieces at divisional radial positions of the welding apparatus; at least one first welding means provided with a plurality of welding torches and at least one position changeable means mounted at the divisional second and fifth positions, respectively; at least one second welding means for performing a second welding step at the upper surface of the divisional third and sixth positions; and at least one product position correcting portion for correcting the unbalanced state of the product clamped on the fourth and seventh positions, thereby grasping the radiators by means of the product clamping means and removing it therefrom to correct its position, and returning the same.

The invention can automatically complete radiator braze welding for performing the flux jetting procedure required for the welding, first and second welding procedures and the correcting procedures in turn at the predetermined cycle during moving of the rotatable plate divided into a plurality of steps.

BRIEF DESCRIPTION OF DRAWINGS

The invention will be best understood with reference to the description taken in connection with the accompanying drawings, in which.

DETAIL DESCRIPTION OF THE INVENTION

Figure 1:
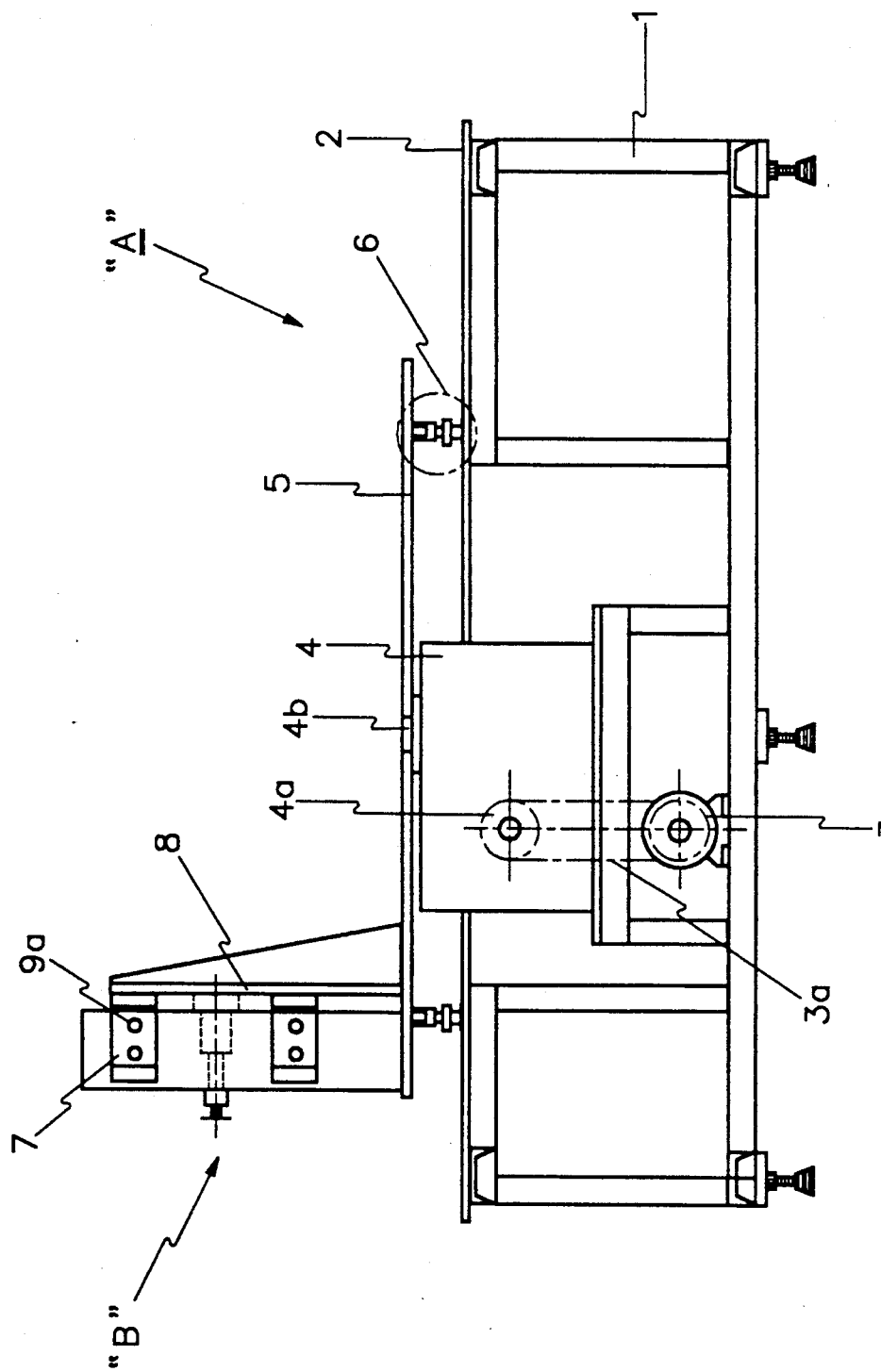
FIG. 1 is a front view showing a divisional rotatable operating portion according to the invention.

The automatic braze welding apparatus of the invention comprises divisional rotation indexing means A, product clamping means B, flux supplying means C, first welding means D, second welding means E and product position correcting means F.

Divisional rotatable operating means A is constructed so that rotatable plate 5 is mounted on indexer 4. This enables plate 5 to be rotated in accordance with predetermined divisional angular movements, typically 45°, under force of motor 3 on main body frame 1. Base plate 2 is securely mounted on the upper surface of main frame 1.

Product clamping means B are installed on a plurality of positions so that aluminum radiators S are safely seated on the radial positions divided by 45° on the periphery of the upper surface of rotatable plate 5.

Flux supplying means C are mounted on the circumference positions of rotatable plate 5 on the upper surface of base plate 2, allowing the proper flux jet required for braze welding of one or more aluminum radiator(s) S.

First welding means D is provided with a plurality of welding torches 22 for preheating/welding the predetermined welding areas of aluminum radiator S on the upper surface of base plate 2. A position changeable means transports radiator S by means of a divisional rotatable indexing means A to the next divisional position with flux being supplied from flux supplying portion C Second welding portion E is mounted on the upper surface of base plate 2. As the radiator S is moved through first welding means D to next means E, additional welding takes place.

Product correcting means F is provided with correcting handle 26 for correcting the potentially unbalanced clamping of radiator S resulting from shifting during the first and second welding procedures.

The automatic braze welding apparatus includes two additional welding means and a second correcting means, similar in function and structure to means D, E and F, respectively.

Figure 4:
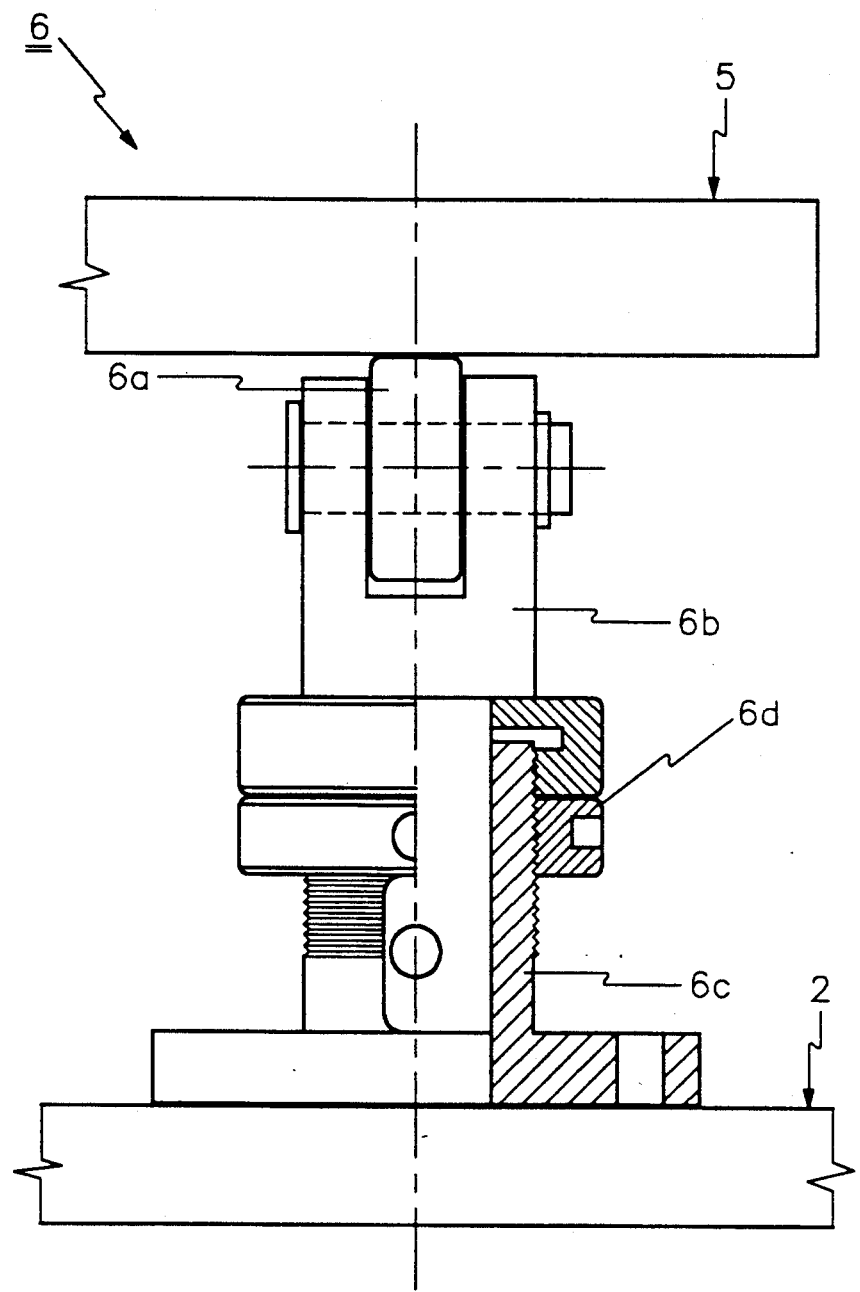
FIG. 4 is an enlarged view showing one of the members supporting the rotatable plate.

As illustrated in FIG. 1, base plate 2 is safely mounted on the upper portion of main body frame 1. Motor 3 and indexer 4 are mounted on a predetermined center portion of main body frame 1. Timing belt 3a is provided between motor 3 and pulley 4a to rotate indexer 4. Rotatable plate 5 is attached to operating shaft 4b of indexer 4. Supporting members 6 are mounted at a plurality of positions of rotatable plate 5 for support. As shown in FIG. 4, upper structure 6b includes roller 6a and fixture 6c. Vertical adjusting is accomplished with nut 6d in order to maintain horizontal leveling of rotatable plate 5 on base plate 2.

Figure 2:
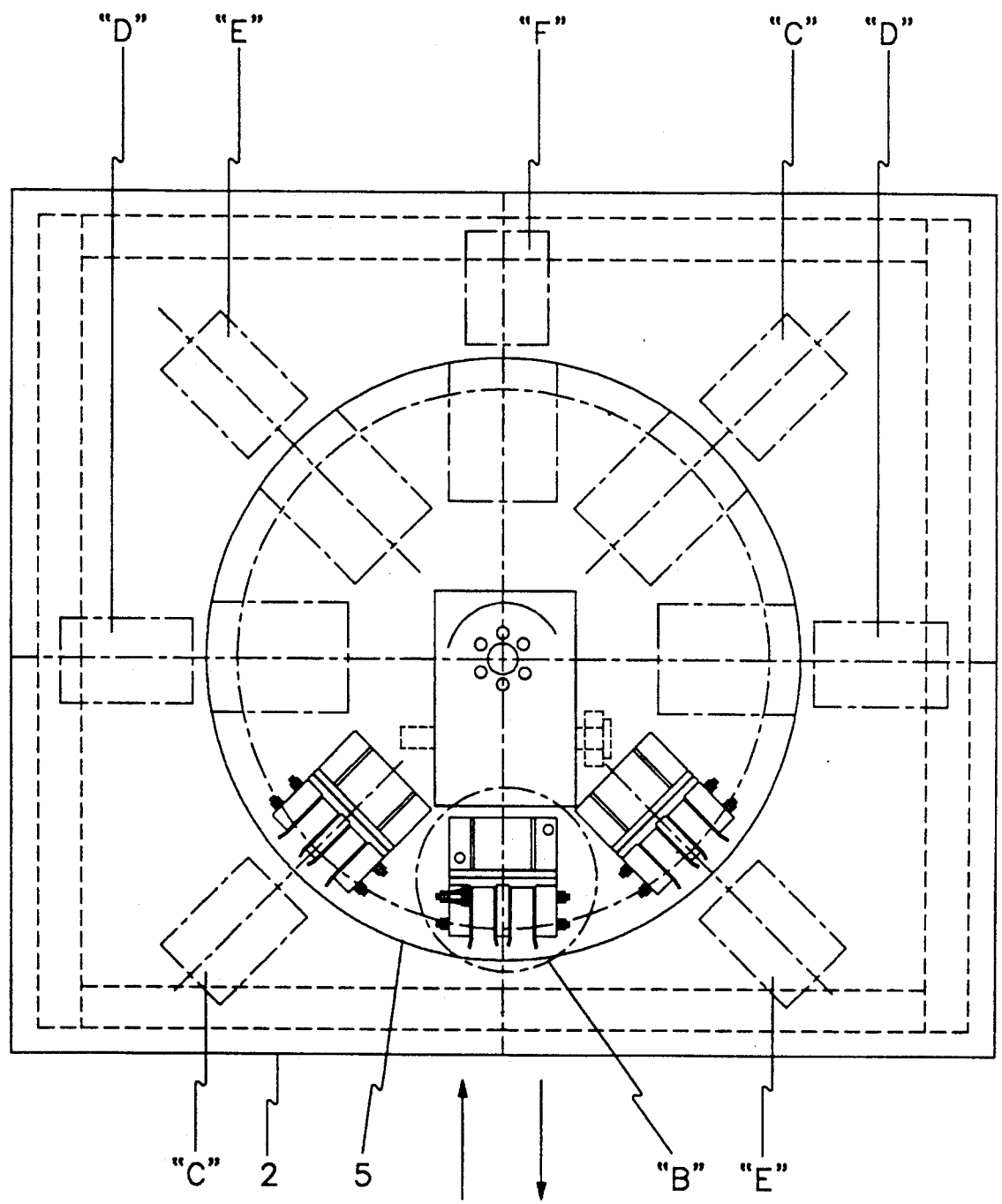
FIG. 2 is a top plan view showing the geometric relationship between the component parts in FIG. 1.
Figure 3:
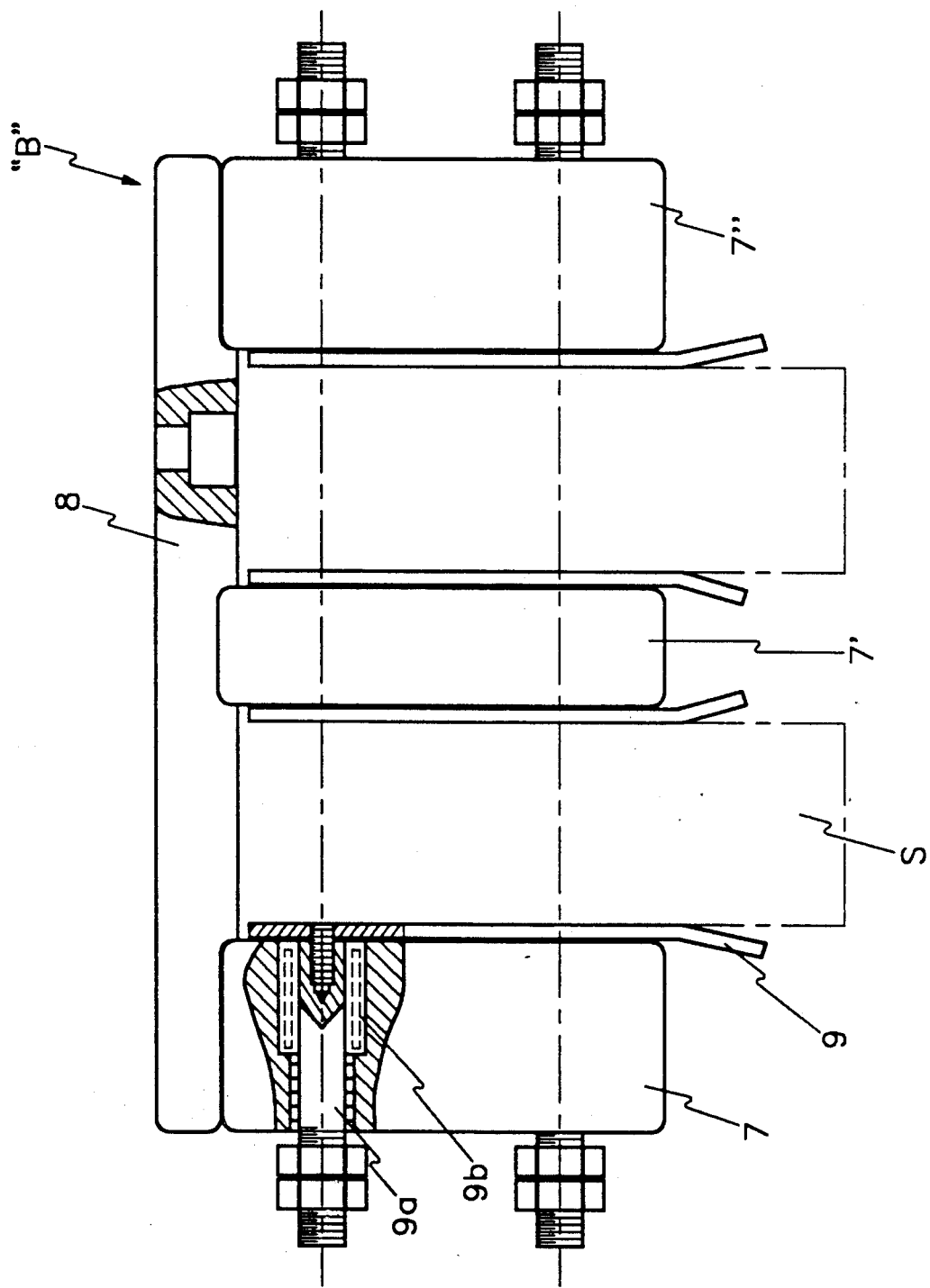
FIG. 3 is an enlarged view showing one of the product clamping portions of FIG. 2.

As illustrated at B of FIG. 2 and more clearly in FIG. 3, a plurality of supporting brackets 8 (to which a plurality of supporting blocks 7, 7', 7'' are bolted) are respectively mounted and radially positioned on the periphery of the upper surface of rotatable plate 5. Each of the supporting blocks 7, 7', 7'', is provided with guide rod 9a, to which pressing plate 9 is integrally coupled by bolts. Elastic member 9b is inserted between guide rod 9a and pressing plate 9 to resiliently seat aluminum radiator S therebetween. With it, product clamping means B is completed.

Figure 5:
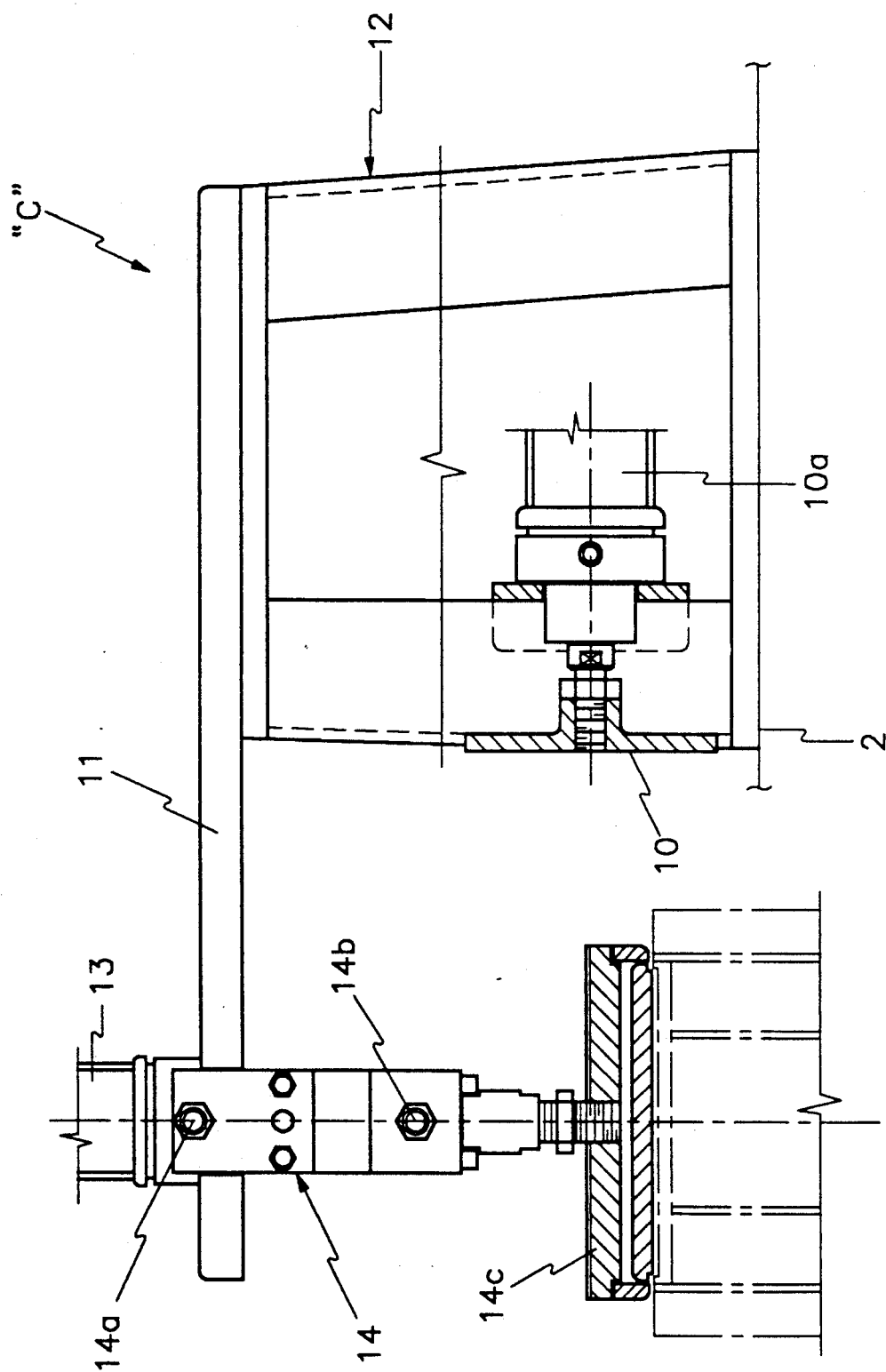
FIG. 5 is a front view showing an assembly of the flux supplying portion according to the invention.
Figure 6:
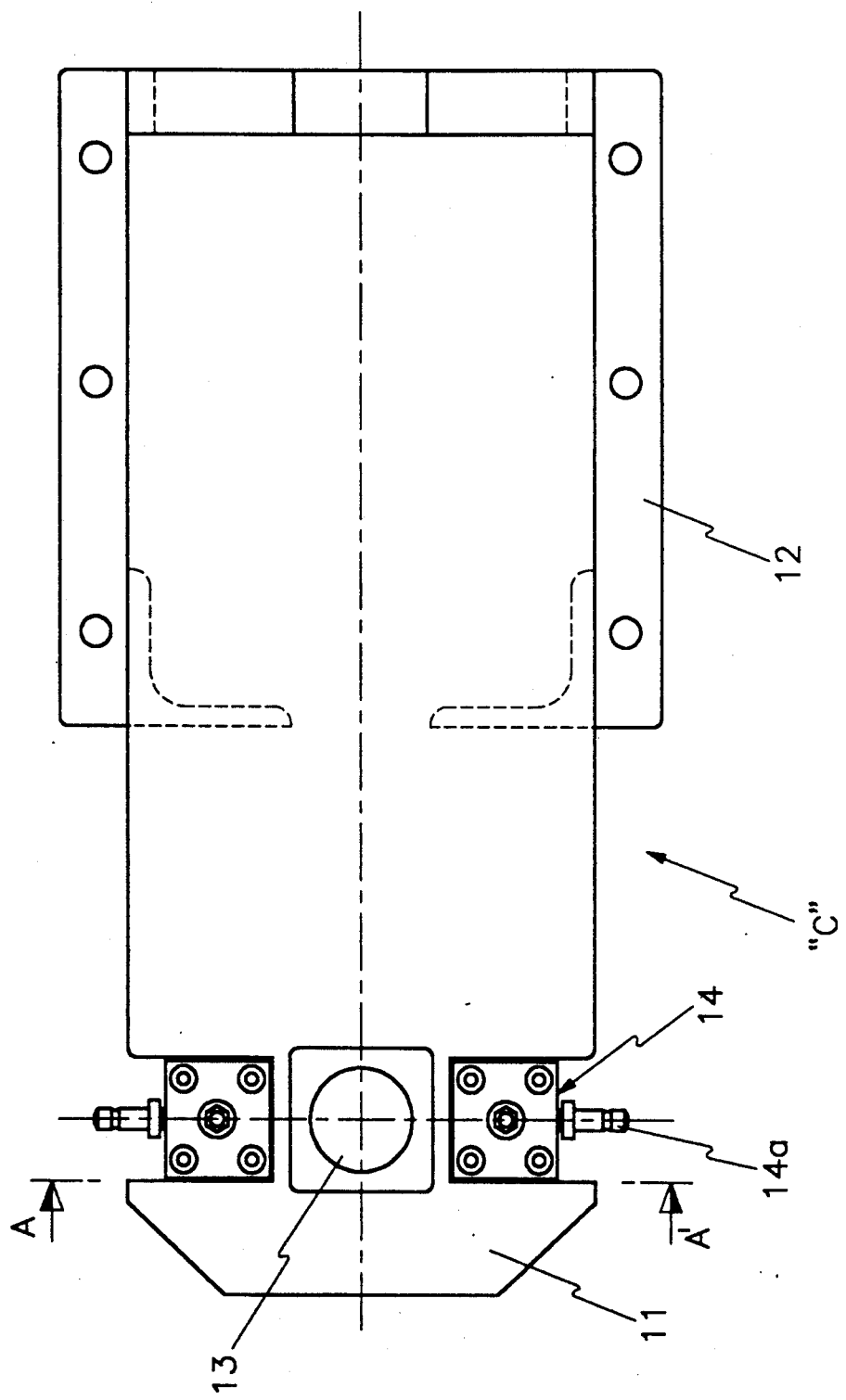
FIG. 6 is a top plan view of FIG. 5.
Figure 7:
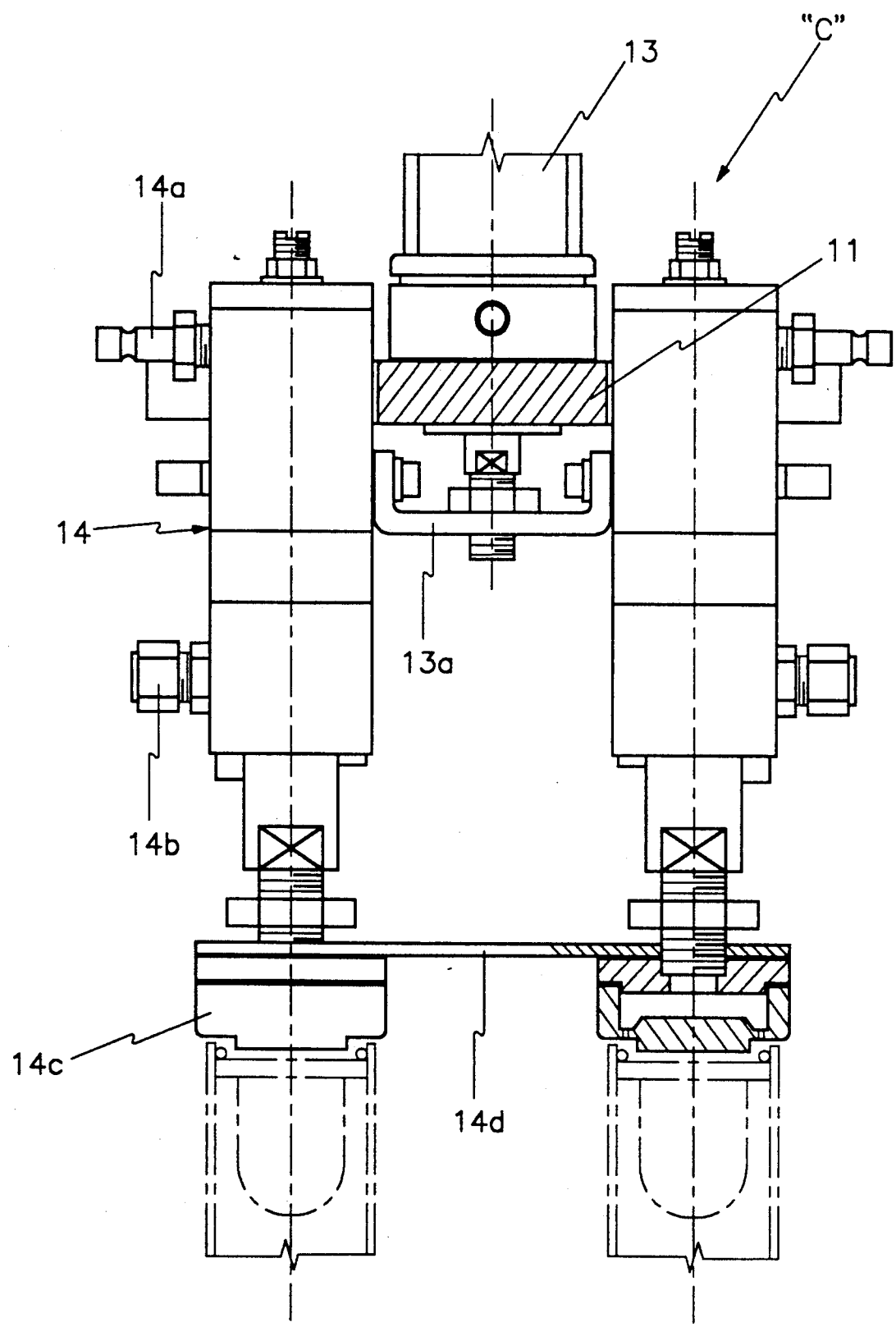
FIG. 7 is a cross-sectional view along line A—A of FIG. 6.

As illustrated in FIGS. 5, 6 and 7, cylinder 10a operates pusher 10 and is mounted integrally thereto. Bracket 12 supports fixing plate 11 which is mounted on the upper surface thereof. Pusher 10, bracket 12 and fixing plate 11 are installed at the first position to which base plate 2 is rotated corresponding to eight evenly divided radial positions of rotatable plate 5 (i.e., eight positions spaced evenly at 45° intervals). Cylinder 13 is fixed to the forward end of fixing plate 11.

Each pair of nozzle bodies 14 has air inlet means 14a and flux inlet means 14b coupled to their upper positions, and jetting means 14c coupled to their lower positions, respectively. Such nozzle assemblies are maintained at the predetermined gap spaced from each other by means of connecting plate 14d (See FIG. 7) fixed on their lower portion and coupled by means of connecting means 13a to the driving shaft of cylinder 13. Flux is jetted to the welding area of radiator S through the opening of jetting means 14c by pneumatics. Hence, flux supplying means C is established.

Figure 8:
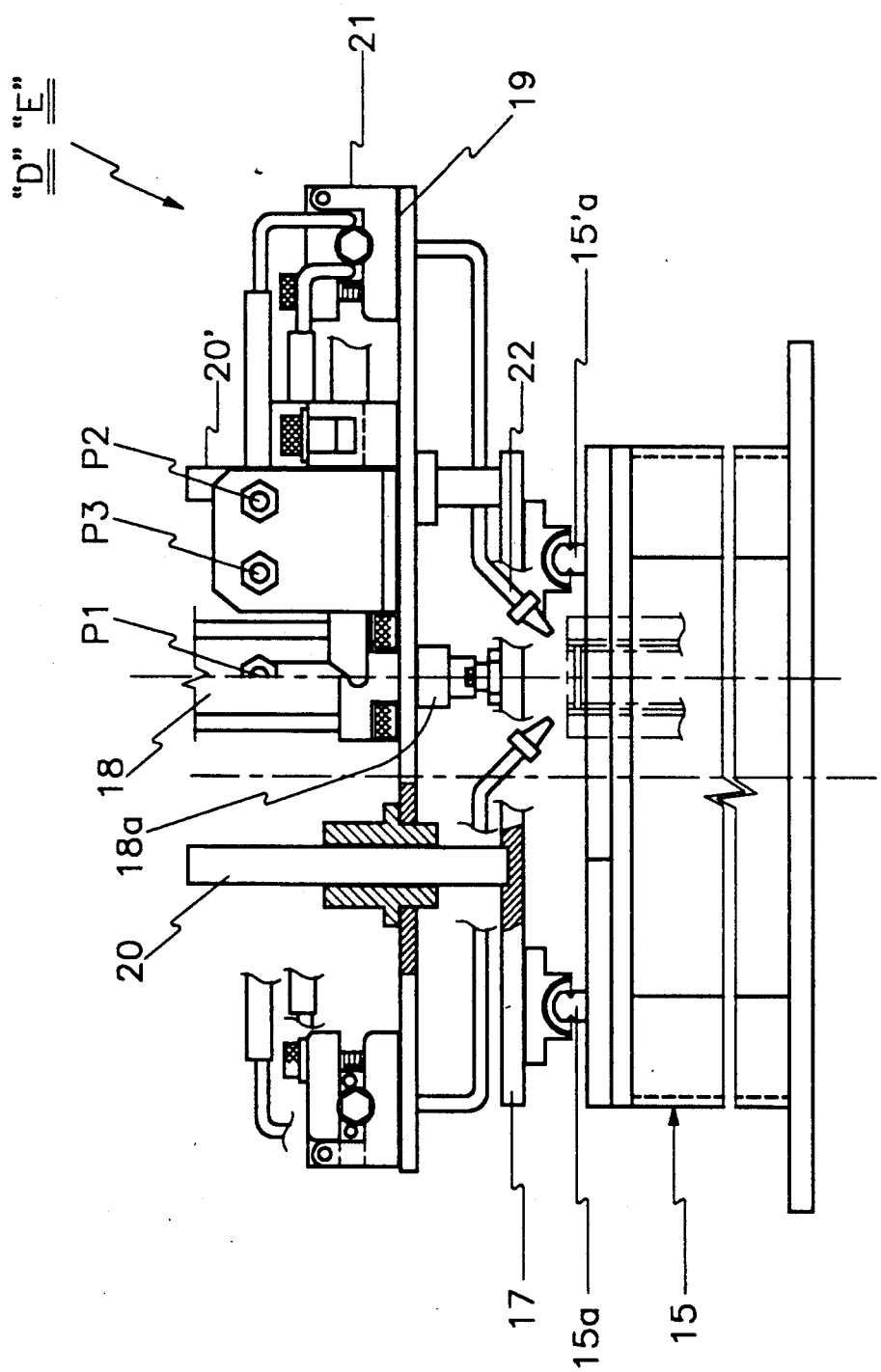
FIG. 8 is a front view showing the assembly of one of first and second welding means according to the invention.
Figure 9:
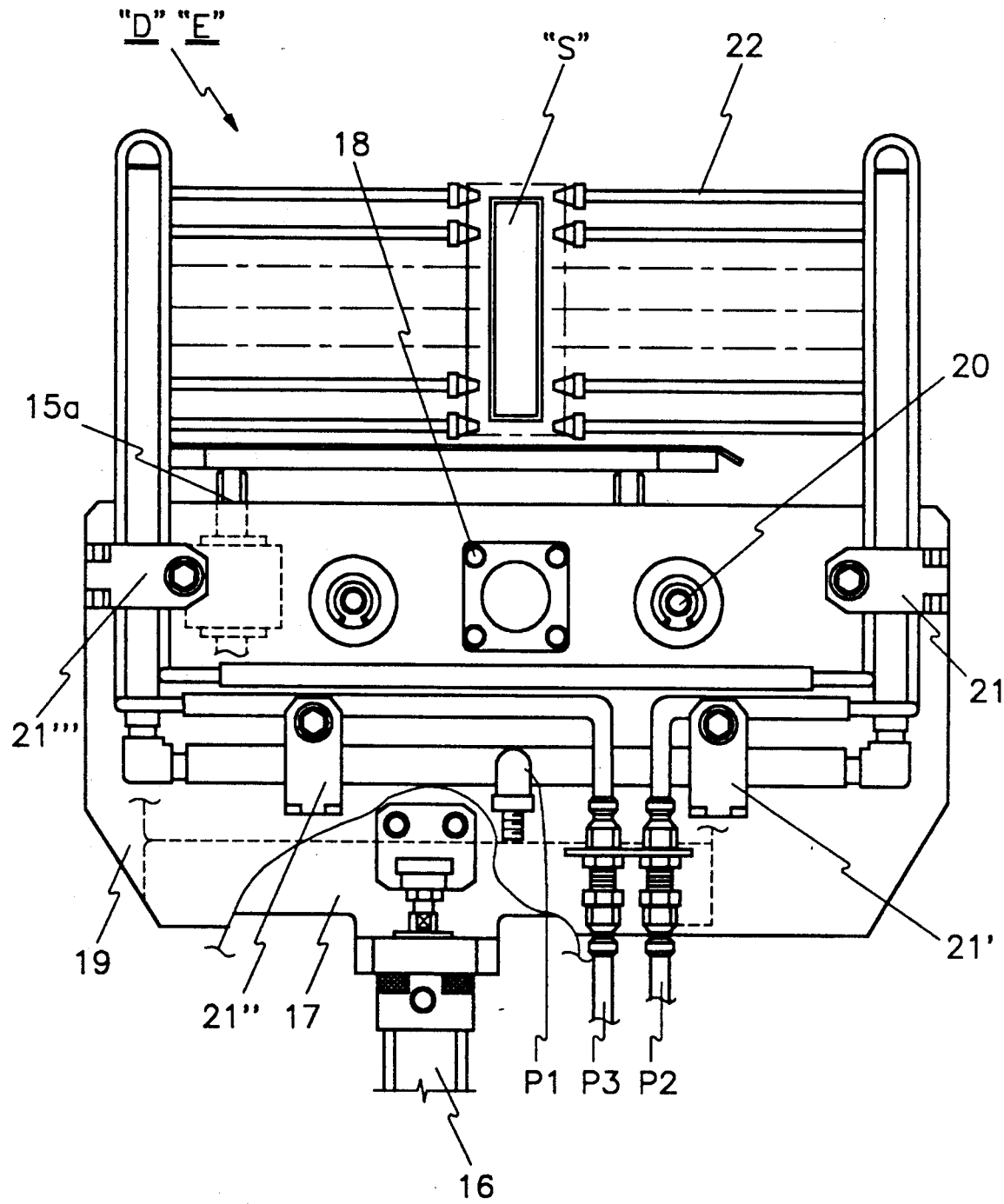
FIG. 9 is a top plan view of FIG. 8.
Figure 10:
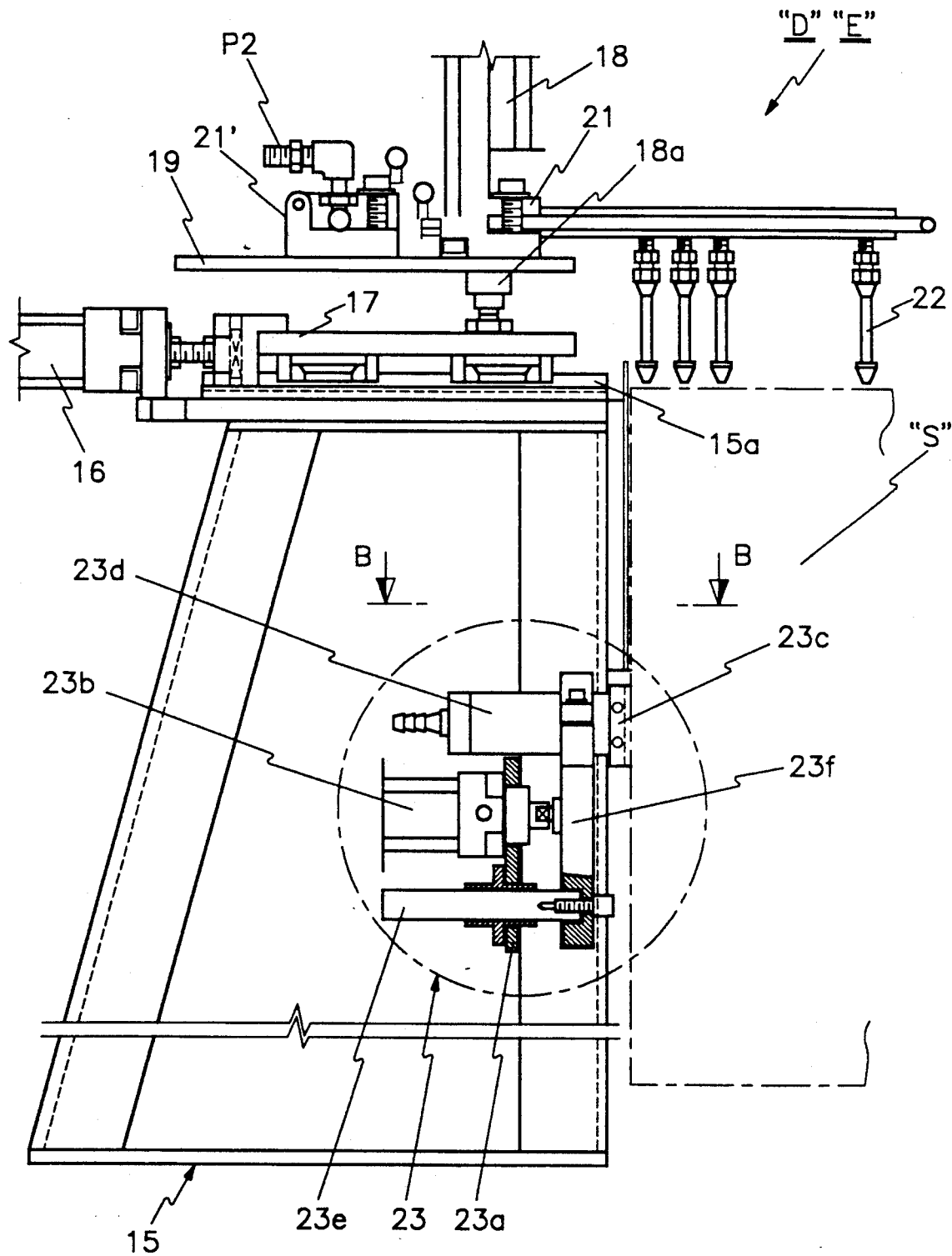
FIG. 10 is a right side view of FIG. 8.

As illustrated in FIGS. 8, 9 and 10, first and second welding portions are mounted at second, third, fifth and sixth positions of the divided upper surface of base plate 2, respectively. Stand frame 15 is provided with guide rail 15a mounted thereon. Forward and rearward moving cylinder 16 (See FIG. 9, for example) is mounted on stand frame 15 to move supporting plate 17, coupled therewith, forward and rearward. Moving plate 19 is provided with vertically moving cylinder 18 mounted via driving shaft 18a on supporting plate 17. Moving plate 19 is also constructed so that its up and down positions can be changed according to the position of guide rod 20 during operation of cylinder 18.

Mixing gas inlet means P1, cooling water inlet means P2 and cooling water outlet means P3 are mounted on the upper surface of moving plate 19 using a plurality of tube type brackets 21, 21', 21'' and 21'''. A plurality of welding torches 22 are disposed at the front end of a plurality of inlet/outlet means.

Figure 11:
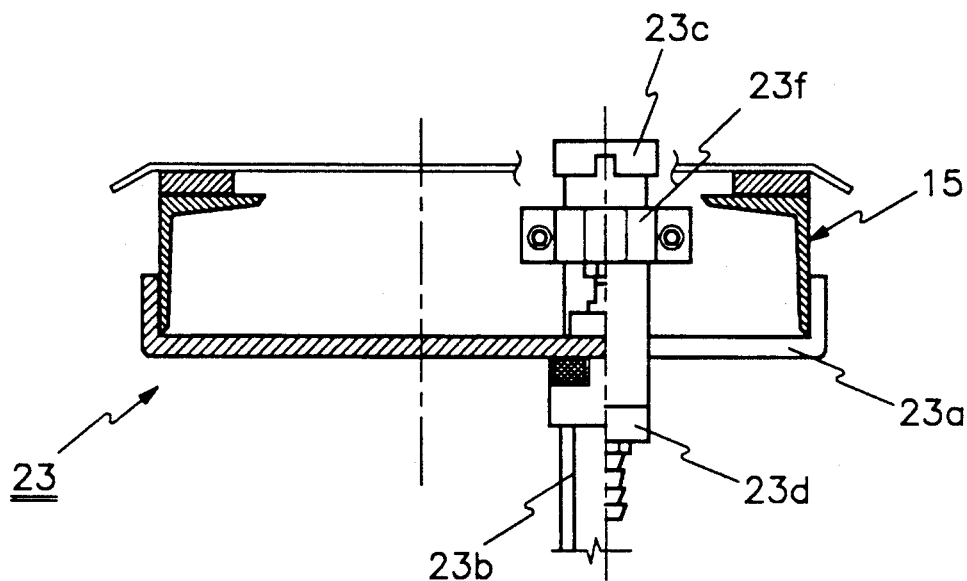
FIG. 11 is a cross-sectional view taken on line B—B of FIG. 10.
Figure 12:
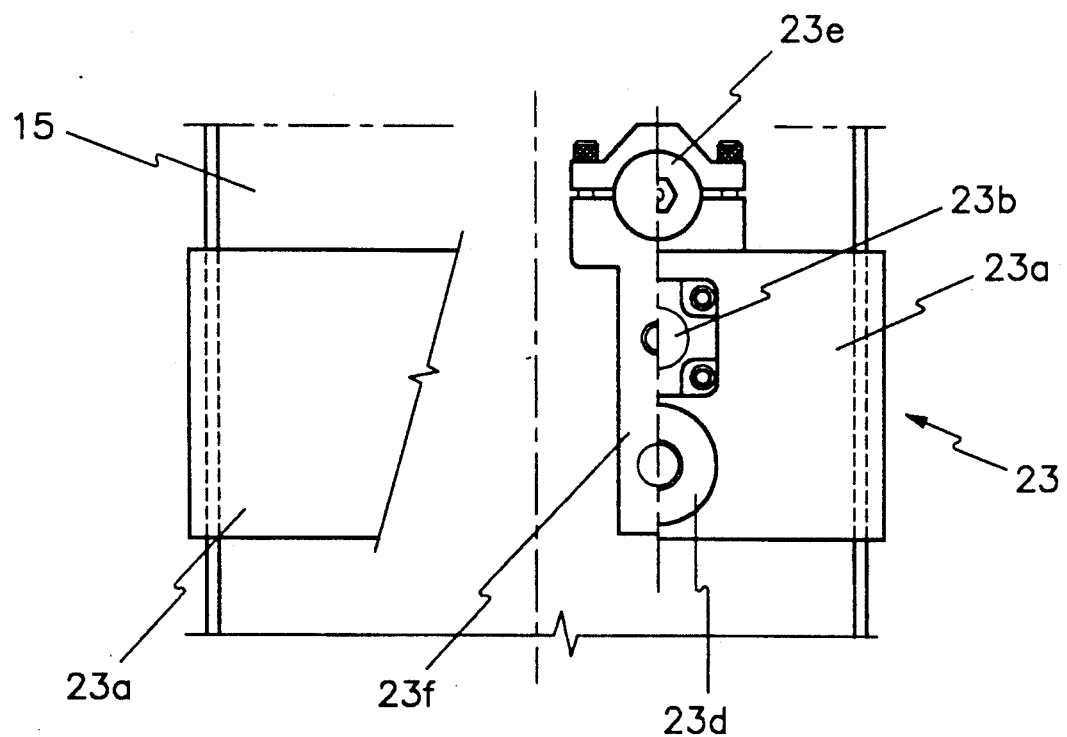
FIG. 12 is a bottom view of FIG. 11.

Second welding means E arranged on third and sixth divisional positions are provided with product vibrating means 23. This vibrating means 23 contains horizontal moving cylinder 23b mounted on coupling means 23a which is integrally connected, via welding, to supporting plate 15. Vibrating means 23d includes vibrating member 23c attached to its front end. Assembling plates 23f, to which guide rod 23e is bolted, are mounted on the driving shaft of horizontal moving cylinder 23b to change the position of radiator S during the second welding, thereby forcing vibrating member 23c to be vibrated in contact with aluminum radiator S, as shown in FIGS. 11 and 12.

Figure 13:
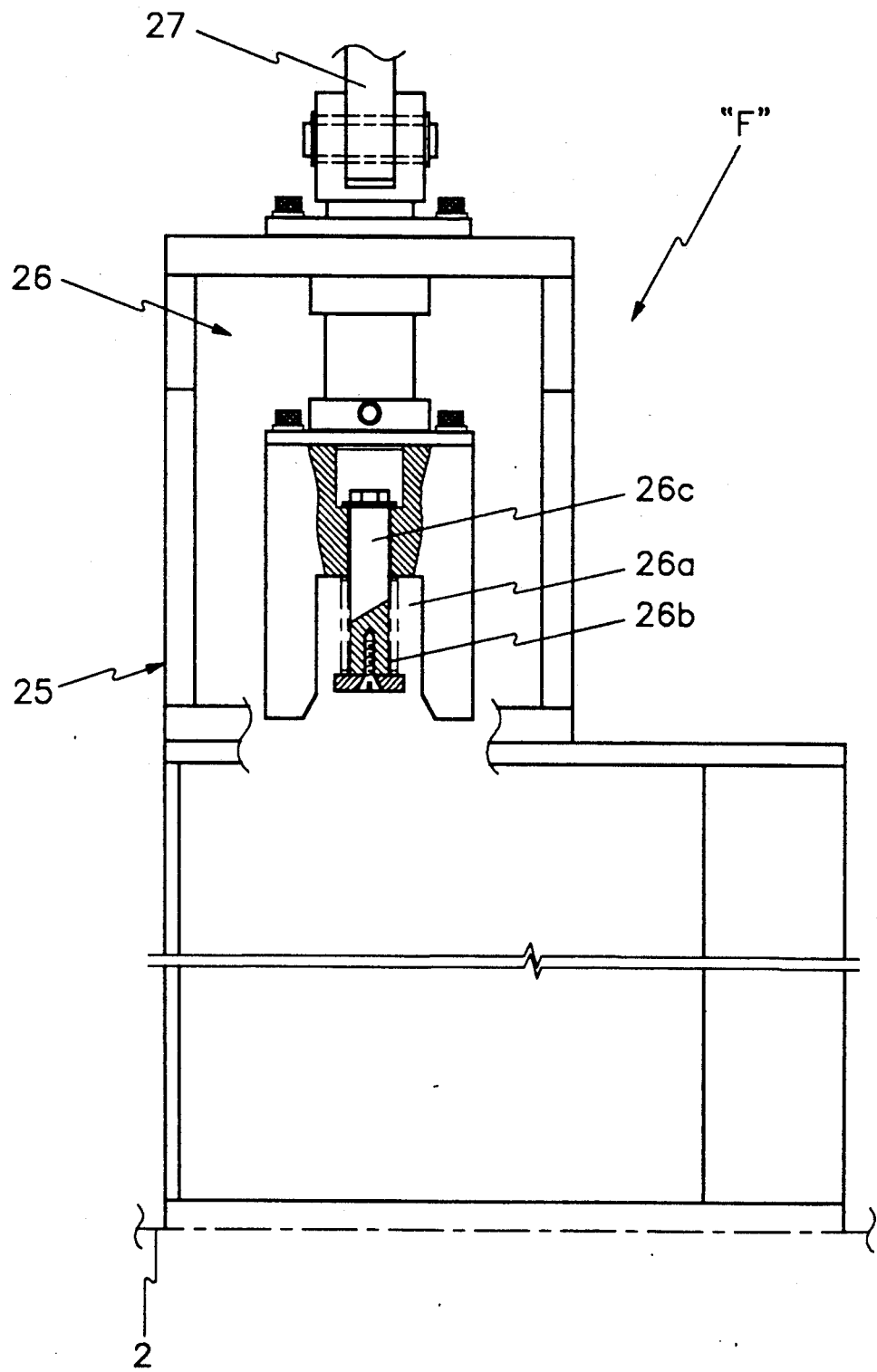
FIG. 13 is a front view showing one of the product correcting means according to the invention.
Figure 14:
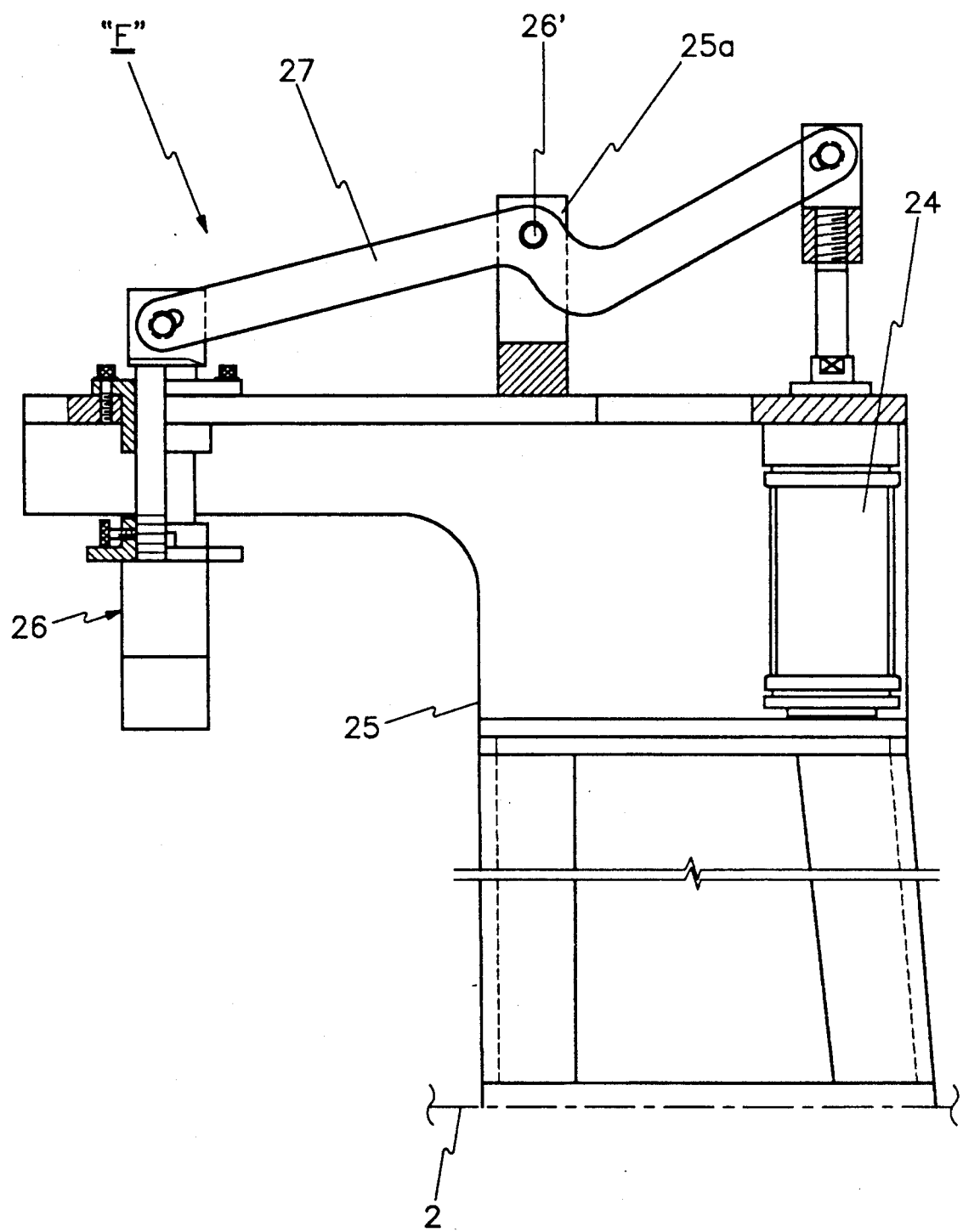
FIG. 14 is a side view of FIG. 13.

As illustrated in FIGS. 13 and 14, position correcting means F is provided with correcting cylinders 26b for performing the procedure following the welding procedures at welding means D and E (which are mounted on fourth and seventh positions divided by 45° on base plate 2). Body frame 25 is mounted on base plate 2 and includes supporting piece 25a. Link 27 is supported at its middle to supporting piece 25a by connecting pin 26', or similar means. This permits link 27 to pivot about pin 26'. The ends of link 27 are connected to cylinder 24 and correcting handle 26 (installed in the front end of body frame 25 as shown at FIG. 14). Correcting handle 26 is moved up and downward according to the control of correcting cylinder 24. Correcting handle 26 is provided with pressing member 26c which is elastically mounted through elastic member 26b in correcting space 26a.

The operation of the invention will now be explained. Dimensional limits can be electronically detected, for example, and the process can be computer controlled or controlled by conventionally known methods. As described above, an automatic braze welding apparatus comprises product clamping means B, which are arranged on eight sections divided by 45° on circular rotatable plate 5 that is part of divisional rotatable operating means A. Flux supplying means C is located on the first of eight places divided in the upper surface of base plate 2. First welding means D is at the second position, and second welding portion E at the third position. Product position correcting means F is located at the fourth position. Another first welding means D is located at the fifth position, and a further second welding means E at the sixth position. An additional product correcting means F is at the seventh position. Finally, the eighth position is for mounting and dismounting the radiators prior to and after welding, respectively.

Each of product clamping means B is mounted by means of supporting bracket 8 on eight places of the upper surface in rotatable plate 5. Product clamping means B clamp a radiator S via the resilient force of elastic member 9b when the radiator S is pushed between pressing plates 9, which are welded to supporting block 7 along with guide rod 9a, and thus, are elastically mounted against each other with elastic member 9b located therebetween as shown in FIG. 3.

In order to keep rotatable plate 5 horizontal during the divisional rotating, rollers 6a of supporting member 6 are mounted by means of fixture 6c on a plurality of places located on base plate 2 as shown in FIG. 4, and remain in contact with the bottom surface of rotatable plate 5. When rotatable plate 5 becomes unbalanced, roller 6a can be adjusted via threaded adjusting nut 6d located between fixture 6c and upper structure 6b.

When the clamping procedure of radiator S is completed, motor 3 is driven to transfer its rotation force through timing belt 3a to pulley 4a of indexer 4, and rotatable plate 5 mounted on driving shaft 4b is rotated in 45° increments. Radiator S is moved clockwise to the flux supplying means C at the first divisional position.

At this time, cylinder 10a, mounted on bracket 12 of flux supplying means C, as shown in FIG. 5, 6 and 7, is moved forward and rearward to correct the position of radiator S clamped in product clamping means B and to position the welding area to correspond to the flux jetting position. Then, cylinder 13 (mounted on the front end of fixing plate 11 which is bolted to the upper surface of bracket 12), is operated to lower both nozzle bodies 14. Flux inlet means 14b and air inlet means 14a are bolted by connector 13a.

The flux jetting means 14c (mounted on the lower section of nozzle bodies 14 by means of connecting plate 14d), is faced toward a predetermined welding area of radiator S corrected by the operation of pusher 10. A flux fluid is then introduced from flux inlet means 14b and distributed in the welding area of radiator S by pneumatics generated by air inlet means 14a.

When the flux distribution is completed as described above, divisional rotatable means A transports radiator S to the second position. This location corresponds to the position of first welding means D mounted on base plate 2. Moving plate 19 is lowered by operation of cylinder 18 via guide rod 20 to move the front ends of welding torches 22 downward to the predetermined welding area of radiator S.

The mixing gas introducing tube, cooling water inlet/outlet tube and welding torches 22 required for the welding are mounted by means of a plurality of tube brackets 21 on the upper surface of moving plate 19, as described above. In this state, the mixing gas is externally supplied through inlet means P1. Cooling water is circulated through inlet means P2 and outlet means P3.

The plurality of welding torches 22 are fired to heat the welding area of radiator S. At this time, supporting plate 17 is horizontally moved with a predetermined stroke period with guidance of rail 15a. This is accomplished by operation of moving cylinder 16. The flames fired from welding torches 22 first perform the preheat/weld with respect to the overall welding area of radiator S.

When the first welding procedure is completed, rotatable plate 5 is again rotated 45° to the third position corresponding to the position of second welding means E. Second welding means E performs every function needed for the welding of radiator S, similar to first welding means D, to heat/weld the welding portion of aluminum radiator S. In addition, second welding means E is provided with product vibrating portion 23 mounted by means of coupling plate 23d on supporting plate 23f.

Horizontal moving cylinder 23d is placed in contact with the radiator (at 23c) and is vibrated. (Cylinder 23d is in vibrating means 23, and is operated with the guidance of rod 23e; and vibrating member 23c of vibrating means 23 is bolted to the other end of assembly plate 23f). This forms a good welding surface since the welding area of radiator S is uniformly heated/welded by the intense heat generated through metallic melting.

When the welding procedure is completed through the operation of first welding means D, (the harmonized operation of parts similar to the first welding portion and product vibrating portion 23 adapted only to second welding portion E), rotatable plate 5 is rotated 45° to the fourth position corresponding to product correcting means F. At this time, correcting cylinder 24 is operated to force one end of link 27 upward (link 27 is mounted by means of connecting pin 26 on supporting piece 25a). Correcting handle 26 (bolted to other end of link 27) is lowered to position radiator S, which is directly below correcting space 26a of correcting handle 26, against the elastic member 26b. Since the radiator S is clamped to product clamping means B, as it passes through all procedures including flux supplying means C, first welding means D, and second welding means E, its clamping position may be altered. Hence, product position correcting means F acts to correct the position of the radiator. When the correcting procedure is finished, cylinder 24 is moved to force radiator S to be free from correcting handle 26 through link 27.

Again, radiator S, formed of aluminum, or copper for example, passes through correcting means F and is then moved through an arc of 45°, via rotation of operation means A, to the fifth position corresponding to the another first welding means D. This welding portion performs the same welding functions same as those of the first welding means D. Radiator S is again moved to the sixth position to another second welding means E. Thereafter, radiator S is moved to the seventh position to allow another correcting means F to correct its position.

When the welding work is finished through the welding procedures described above, radiator S is moved to the original position and is removed from the apparatus. It is noted that a worker can remove the aluminum radiators from the product clamping means B during any idle phase of the process.

A plurality of aluminum radiators S can be successively welded using the above detailed apparatus and method. The present invention achieves superior product weld uniformity and can be mass-produced. The invention can be realized by factory automation for reduced manpower and enhanced product yield capacity.

The actual welding torches, gases and flux, etc., used in the present invention are those commonly known to practitioners in the welding field.

The above examples provided in the description of the structure and method of the present invention are not meant to limit the scope of the invention. Variations believed to be covered by the present invention will become evident to those skilled in the welding art.

What is claimed is:
1. An automatic braze welding apparatus comprising:
   an indexing drive means for forcing a rotatable plate to be rotated in 45° periodic increments spanning a plurality of divided radial positions;
   a plurality of product clamping means for seating at least one radiator product at the divided radial positions;

at least one flux supplying means mounted on a first position of the divisional rotatable plate;

at least one first welding means provided with a plurality of welding torches and a position changeable means mounted on at least two non-consecutive positions of said plurality of divided radial positions;

at least one second welding means for performing second welding work at an upper surface of at least two further non-consecutive positions of said plurality of divided radial positions; and a product position correcting means for correcting a potential unbalanced state of the at least one radiator product at two still further non-consecutive positions of said plurality of divided radial positions.

2. An automatic braze welding apparatus as claimed in claim 1, wherein said indexing drive means comprises:

a base plate mounted on an upper portion of a main body frame;

a motor and an indexer mounted on a predetermined position of a center portion of said base plate; and a timing belt provided between the motor and a pulley to rotate said indexer in said 45° periodic increments, wherein said rotatable plate is coupled to an operating shaft of the indexer.

3. An automatic braze welding apparatus as claimed in claim 2, further comprising:

a plurality of supporting members mounted between the base plate and the rotatable plate at a plurality of positions to level said rotatable plate; and nut means for adjusting said plurality of supporting members.

4. An automatic braze welding apparatus of claim 1, wherein the product clamping means further comprise:

a plurality of supporting brackets to which a plurality of the supporting blocks are bolted to mount said brackets at an upper surface of the rotatable plate at each of the divided radial positions, each of said supporting blocks is provided with a guide rod, a pressing member, a pressing plate and an elastic member inserted between the guide rod and a pressing plate to seat said at least one radiator product.

5. An automatic braze welding apparatus as claimed as claim 1, wherein said flux supplying means includes:

a cylinder having an integrally mounted operating pusher;

a bracket having a fixing plate mounted on a upper surface thereof at a first position, and another cylinder fixed to a front end of the fixing plate;

a pair of nozzle bodies each having an air inlet and a flux inlet located at upper positions of the bodies, and jetting means coupled at the upper positions, and maintained at a predetermined gap from each other by a connecting plate and coupled by connecting means to an operating shaft of the cylinder, thereby jetting the flux to a welding area of at least one radiator product.

6. An automatic braze welding apparatus as claimed in claim 1, in which:

said first and second welding portions are mounted at second, third, fifth and sixth positions of the upper surface of a base plate; said welding means including:

a stand frame provided with a guide rail mounted thereon;

a moving cylinder mounted on the stand frame to translationally move a supporting plate along said guide rail; said supporting plate carrying vertical guide rod means;

a moving plate provided with a vertically moving cylinder mounted through a shaft of the vertically moving cylinder on the supporting plate, wherein its movable positions can be changed according to the operation of the moving cylinder;

gas inlet means for mixing gas for combustion;

a cooling water inlet means and a cooling outlet means mounted on the upper surface of the moving plate, for cooling the automatic braze welding apparatus; and a plurality of welding torches disposed at a front end of said inlet and outlet means.

7. An automatic braze welding apparatus as claimed in claim 6, in which;

second welding means are arranged on third and sixth divided radial positions and are provided with a product vibrating means, said vibrating portion comprising:

a vibrating member attached to a front end of a driving shaft of a horizontal moving cylinder to change the position during the second welding, thereby forcing the vibrating member to be vibrated in contact with the radiator.

8. An automatic braze welding apparatus as claimed in claim 1, wherein said:

product correcting means is mounted on a fourth and a seventh divided radial position of the body frame having a supporting piece fixed thereon and mounted on the base plate, and comprising:

a vertically pivotal link supported at its middle by a connecting pin to a supporting piece of the base plate, said link including two ends of which a first is connected to a cylinder and a second is connected to a connecting handle installed in a front end of the body frame, the correcting handle provided with a pressing member which is elastically mounted by an elastic member in a correcting space so as to engage the radiator for proper positioning.

* * * * *